United States Patent
Kohli et al.

(10) Patent No.: US 9,482,100 B2
(45) Date of Patent: *Nov. 1, 2016

(54) MULTI-LOBED COOLING HOLE

(71) Applicant: United Technologies Corporation, Hartford, CT (US)

(72) Inventors: Atul Kohli, Tolland, CT (US); Matthew S. Gleiner, Vernon, CT (US)

(73) Assignee: United Technologies Corporation, Hartford, CT (US)

(*) Notice: Subject to any disclaimer, the term of this patent is extended or adjusted under 35 U.S.C. 154(b) by 667 days.

This patent is subject to a terminal disclaimer.

(21) Appl. No.: 13/629,916

(22) Filed: Sep. 28, 2012

(65) Prior Publication Data

US 2014/0219815 A1 Aug. 7, 2014

Related U.S. Application Data

(60) Provisional application No. 61/599,372, filed on Feb. 15, 2012, provisional application No. 61/599,381, filed on Feb. 15, 2012.

(51) Int. Cl.

| | |
|---|---|
| *F01D 5/18* | (2006.01) |
| *F01D 9/06* | (2006.01) |
| *F23R 3/00* | (2006.01) |
| *F23R 3/06* | (2006.01) |

(52) U.S. Cl.
CPC ............... *F01D 5/18* (2013.01); *F01D 5/186* (2013.01); *F01D 5/187* (2013.01); *F01D 9/065* (2013.01); *F23R 3/002* (2013.01); *F23R 3/06* (2013.01); *F05D 2240/81* (2013.01); *F05D 2260/202* (2013.01); *F23R 2900/03042* (2013.01); *Y02T 50/676* (2013.01)

(58) Field of Classification Search
None
See application file for complete search history.

(56) References Cited

U.S. PATENT DOCUMENTS

| | | |
|---|---|---|
| 4,197,443 A | 4/1980 | Sidenstick |
| 4,529,358 A | 7/1985 | Papell |

(Continued)

FOREIGN PATENT DOCUMENTS

| | | |
|---|---|---|
| EP | 1326007 A2 | 7/2003 |
| EP | 1609949 A1 | 12/2005 |

OTHER PUBLICATIONS

The International Search Report mailed Nov. 6, 2013 for International Application No. PCT/US2013/025711.

(Continued)

*Primary Examiner* — Craig Kim
*Assistant Examiner* — Michael Sehn
(74) *Attorney, Agent, or Firm* — Kinney & Lange, P.A.

(57) ABSTRACT

A gas turbine engine component subjected to a flow of high temperature gas includes a wall having first and second wall surfaces and a cooling hole extending through the wall. The cooling hole includes an inlet located at the first wall surface, an outlet located at the second wall surface, a metering section extending downstream from the inlet and a diffusing section extending from the metering section to the outlet. The diffusing section includes a first lobe, a second lobe and a transition region. The first lobe diverges longitudinally and laterally from the metering section and has a first shape. The second lobe is generally opposite the first lobe and diverges longitudinally and laterally from the metering section and has a second shape different from the first shape. The transition region is positioned between the first and second lobes and includes a downstream end adjacent the outlet.

20 Claims, 9 Drawing Sheets

(56) References Cited

U.S. PATENT DOCUMENTS

| | | |
|---|---|---|
| 4,622,821 A | 11/1986 | Madden |
| 4,653,279 A | 3/1987 | Reynolds |
| 4,653,983 A | 3/1987 | Vehr |
| 4,672,727 A | 6/1987 | Field |
| 4,684,323 A | 8/1987 | Field |
| 4,700,544 A | 10/1987 | Fucci |
| 4,738,588 A | 4/1988 | Field |
| 5,062,768 A | 11/1991 | Marriage |
| 5,096,379 A | 3/1992 | Stroud et al. |
| 5,129,231 A | 7/1992 | Becker et al. |
| 5,252,026 A | 10/1993 | Shepherd |
| 5,326,224 A | 7/1994 | Lee et al. |
| 5,358,374 A | 10/1994 | Correia et al. |
| 5,382,133 A | 1/1995 | Moore et al. |
| 5,418,345 A | 5/1995 | Adamski |
| 5,419,681 A | 5/1995 | Lee |
| 5,609,779 A | 3/1997 | Crow et al. |
| 5,651,662 A | 7/1997 | Lee et al. |
| 5,660,525 A | 8/1997 | Lee et al. |
| 5,683,600 A | 11/1997 | Kelley et al. |
| 5,813,836 A | 9/1998 | Starkweather |
| 6,139,258 A | 10/2000 | Lang, III et al. |
| 6,183,199 B1 | 2/2001 | Beeck et al. |
| 6,241,468 B1 | 6/2001 | Lock et al. |
| 6,243,948 B1 | 6/2001 | Lee et al. |
| 6,287,075 B1 | 9/2001 | Kercher |
| 6,307,175 B1 | 10/2001 | Blochlinger et al. |
| 6,494,678 B1 | 12/2002 | Bunker |
| 6,547,524 B2 | 4/2003 | Kohli et al. |
| 6,572,335 B2 | 6/2003 | Kuwabara et al. |
| 6,744,010 B1 | 6/2004 | Pepe et al. |
| 6,944,580 B1 | 9/2005 | Blume et al. |
| 6,973,419 B1 | 12/2005 | Fortin et al. |
| 6,979,176 B2 | 12/2005 | Nakamata et al. |
| 7,186,085 B2 | 3/2007 | Lee |
| 7,273,351 B2 | 9/2007 | Kopmels |
| 7,328,580 B2 | 2/2008 | Lee et al. |
| 7,374,401 B2 | 5/2008 | Lee |
| 7,578,653 B2 | 8/2009 | Klasing et al. |
| 7,726,131 B2 | 6/2010 | Sze et al. |
| 7,766,609 B1 | 8/2010 | Liang |
| 7,887,294 B1 | 2/2011 | Liang |
| 7,997,868 B1 | 8/2011 | Liang |
| 8,038,399 B1 | 10/2011 | Liang |
| 8,057,181 B1 | 11/2011 | Liang |
| 8,066,484 B1 | 11/2011 | Liang |
| 2001/0036401 A1 | 11/2001 | Harvey et al. |
| 2002/0159888 A1 | 10/2002 | Rinck et al. |
| 2005/0106020 A1 | 5/2005 | Bunker et al. |
| 2006/0073015 A1 | 4/2006 | Liang |
| 2008/0003096 A1 | 1/2008 | Kohli et al. |
| 2008/0095622 A1 | 4/2008 | Naik et al. |
| 2008/0145208 A1 | 6/2008 | Klasing et al. |
| 2009/0013695 A1 | 1/2009 | Dierberger et al. |
| 2009/0304499 A1 | 12/2009 | Strock et al. |
| 2010/0068032 A1 | 3/2010 | Liang |
| 2010/0068068 A1 | 3/2010 | Liang |
| 2010/0282721 A1 | 11/2010 | Bunker et al. |
| 2011/0097191 A1 | 4/2011 | Bunker |
| 2011/0185572 A1 | 8/2011 | Wei et al. |
| 2011/0293423 A1 | 12/2011 | Bunker et al. |
| 2012/0051941 A1 | 3/2012 | Bunker |

OTHER PUBLICATIONS

Kusterer, K. et al. "The Nekomimi Cooling Technology: Cooling Holes with Ears for High-Efficient Film Cooling" Proceedings of ASME Turbo Expo 2011, Jun. 6-10, 2011. 11 pages.

European Patent Office, the extended European search report, Dec. 8, 2015, 8 pages.

Jack D. Mattingly, Elements of Gas Turbine Propulsion, 1996, pp. GE-1014.001-GE-1014.129, McGrawhill, Inc., United States.

Je-Chin Han et al., Gas Turbine Heat Transfer and Cooling Technology, 2000, pp. GE-1008.001-GE-1008.159, Taylor & Francis, New York.

Ronald S. Bunker, A Review of Shaped Hole Turbine Film-Cooling Technology, Journal of Heat Transfer, Apr. 2005, vol. 127, pp. GE-1010.001-GE1010.013.

John Eaton, PH.D., In the United States Patent and Trademark Office before the Patent Trial and Appeal Board, Declaration of John Eaton, PH.D., Jul. 9, 2012, pp. GE-1003.001-GE-1003.087, United States.

MULTI-LOBED COOLING HOLE

CROSS-REFERENCE TO RELATED APPLICATION(S)

This application claims priority to U.S. Provisional Application No. 61/599,372, filed on Feb. 15, 2012 and entitled "MULTI-LOBED COOLING HOLE AND METHOD OF MANUFACTURE" and U.S. Provisional Application No. 61/599,381, filed on Feb. 15, 2012 and entitled "TRI-LOBED COOLING HOLE AND METHOD OF MANUFACTURE", the disclosures of which are incorporated by reference in their entirety.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines are also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

A gas turbine engine component subjected to a flow of high temperature gas includes a wall having first and second wall surfaces and a cooling hole extending through the wall. The cooling hole includes an inlet located at the first wall surface, an outlet located at the second wall surface, a metering section extending downstream from the inlet and a diffusing section extending from the metering section to the outlet. The diffusing section includes a first lobe, a second lobe and a transition region. The first lobe diverges longitudinally and laterally from the metering section and has a first shape. The second lobe is generally opposite the first lobe and diverges longitudinally and laterally from the metering section and has a second shape different from the first shape. The transition region is positioned between the first and second lobes and includes a downstream end adjacent the outlet.

A wall of a component of a gas turbine engine subjected to a flow of high temperature gas includes first and second wall surfaces, an inlet located at the first wall surface, an outlet located at the second wall surface, a metering section commencing at the inlet and extending downstream from the inlet and a diffusing section extending from the metering section and terminating at the outlet. The diffusing section includes a first lobe diverging longitudinally and laterally from the metering section and having a first shape, a second lobe generally opposite the first lobe and diverging longitudinally and laterally from the metering section and having a second shape different from the first shape, and a transition region positioned between the first and second lobes and having a downstream end adjacent the outlet.

DETAILED DESCRIPTION

Figure 1:
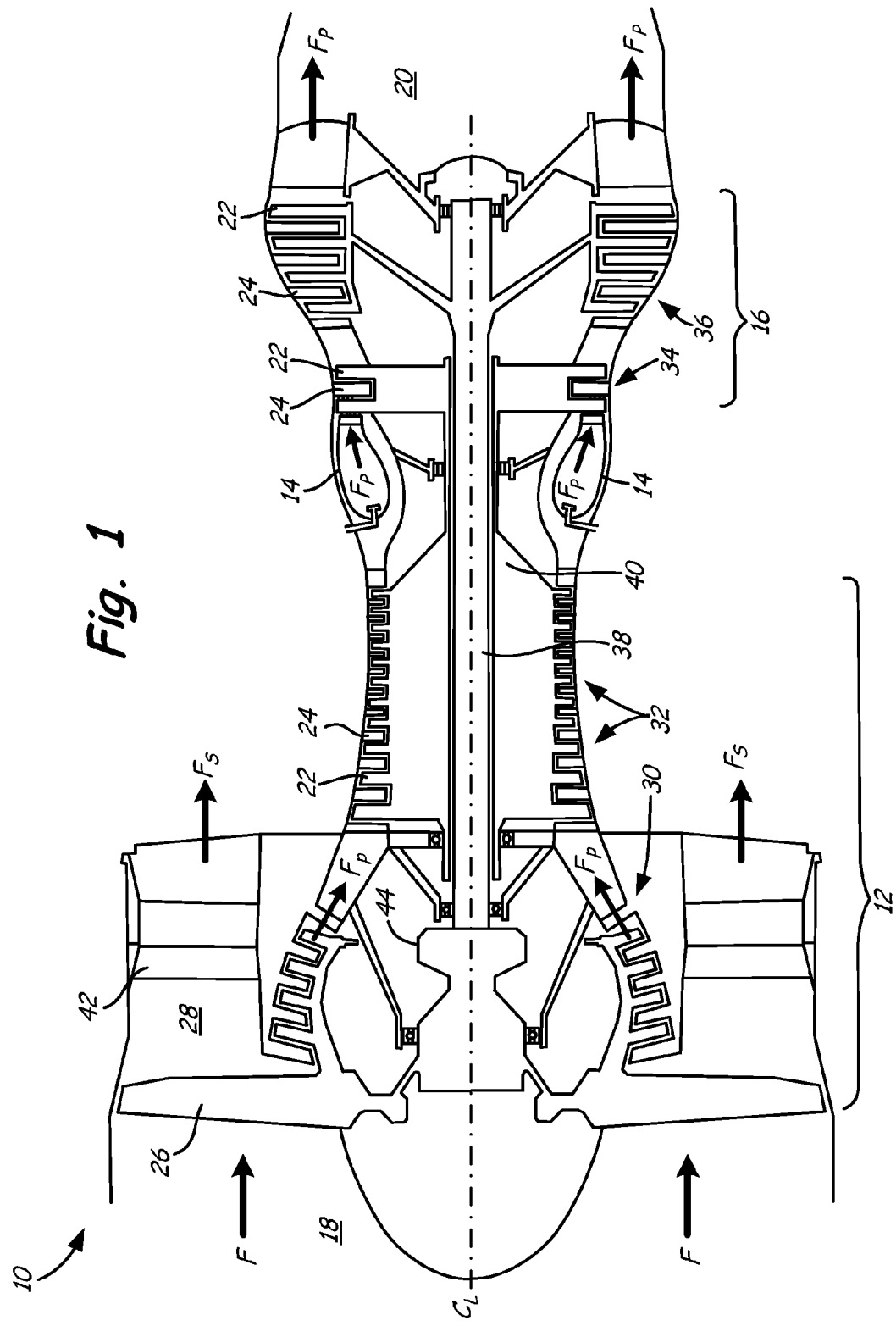
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage may also be provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but are not limited to, cooled gas turbine engine components in compressor sections 30 and 32, combustor 14, turbine sections 34 and 36, and exhaust section 20 of gas turbine engine 10.

Figure 2A:
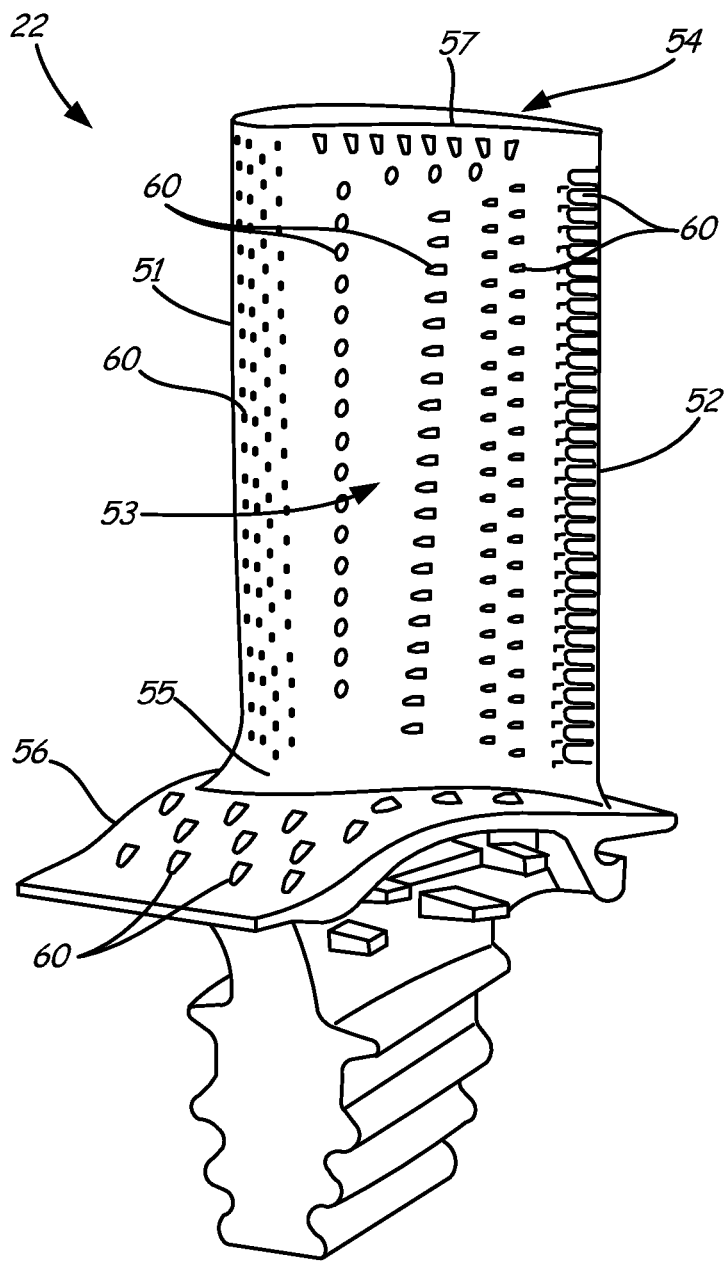
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
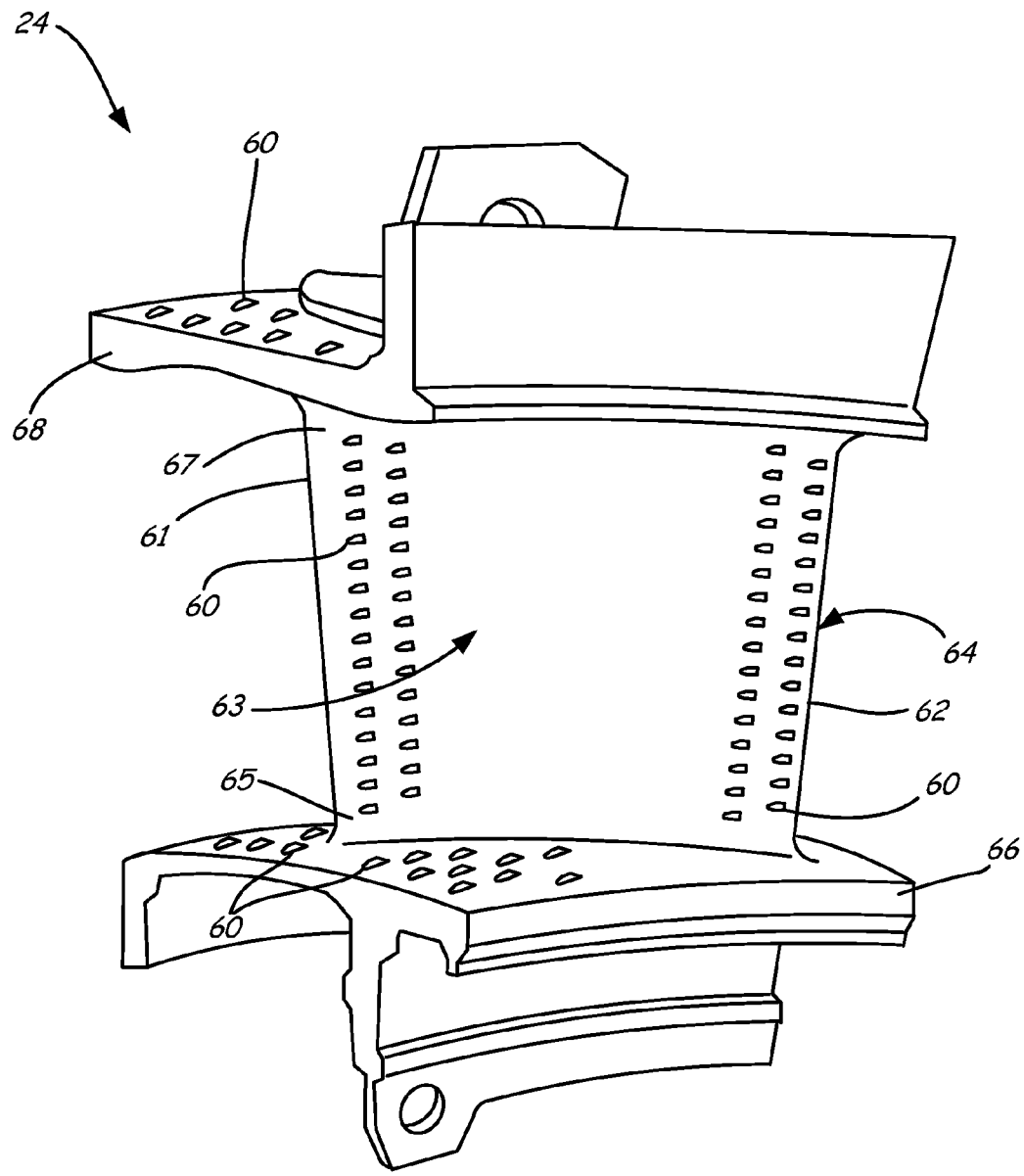
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

Although surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot outer surfaces of airfoils 22 and 24, and other gas turbine engine components, so that less flow is needed for cooling and efficiency is maintained or increased.

Figure 3:
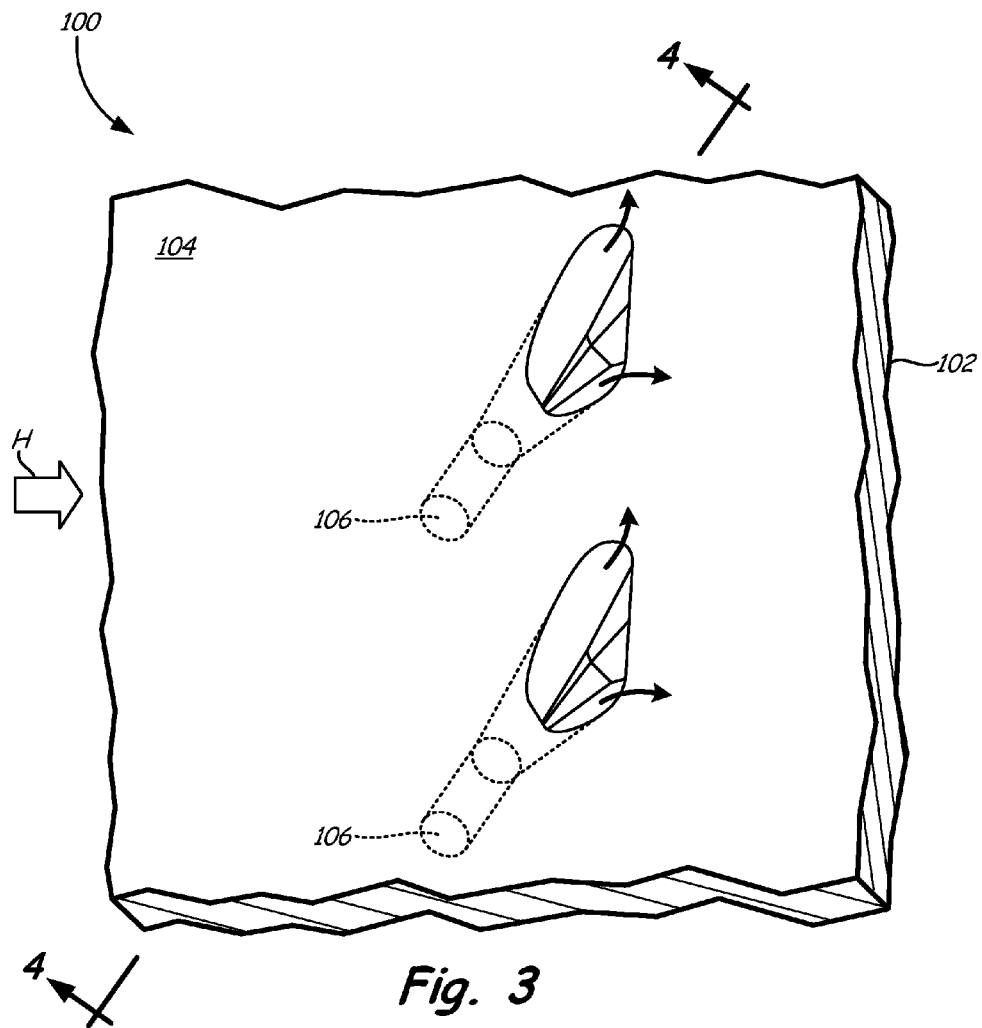
FIG. 3 is a view of a wall having multi-lobed cooling holes.

FIG. 3 illustrates a view of a wall having cooling holes. Wall 100 includes first wall surface 102 and second wall surface 104. As described in greater detail below, wall 100 is metallic and second wall surface 104 can include a thermal barrier coating. Cooling holes 106 are oriented so that their outlets are positioned on second wall surface 104. During gas turbine engine operation, second wall surface 104 is in proximity to high temperature gases (e.g., combustion gases, hot air). Cooling air is delivered inside wall 100 where it exits the interior of the component through cooling holes 106 and forms a cooling film on second wall surface 104. As shown in FIG. 3, cooling holes 106 have two lobes in the diffusing section of the cooling hole outlet on second wall surface 104.

As described below in greater detail, cooling air flows out of cooling holes 106, with cooling air flowing through each of the lobes in the diffusing section. Cooling holes 106 can be arranged in a row on wall 100 as shown in FIG. 3 and positioned so that a longitudinal axis of the cooling hole is substantially different from the general direction of the high temperature gases flowing past wall 100. In this embodiment, cooling air passing through cooling holes 106 travels in a different direction with respect to the high temperature gases flowing along second wall surface 104 (represented by arrow H). In other embodiments, the cooling air passing through cooling holes 106 is substantially parallel to the high temperature gases. Here, the row of cooling holes 106 is substantially perpendicular to the direction of flow H. Cooling holes 106 can also be provided in a staggered formation or other formation on wall 100. Cooling holes 106 can be located on a variety of components that require cooling. Suitable components include, but are not limited to, turbine vanes and blades, combustors, blade outer air seals, and augmentors, etc. Cooling holes 106 can be located on the pressure side or suction side of vanes and blades. Cooling holes 106 can also be located on the blade tip or blade or vane platforms.

Figure 4:
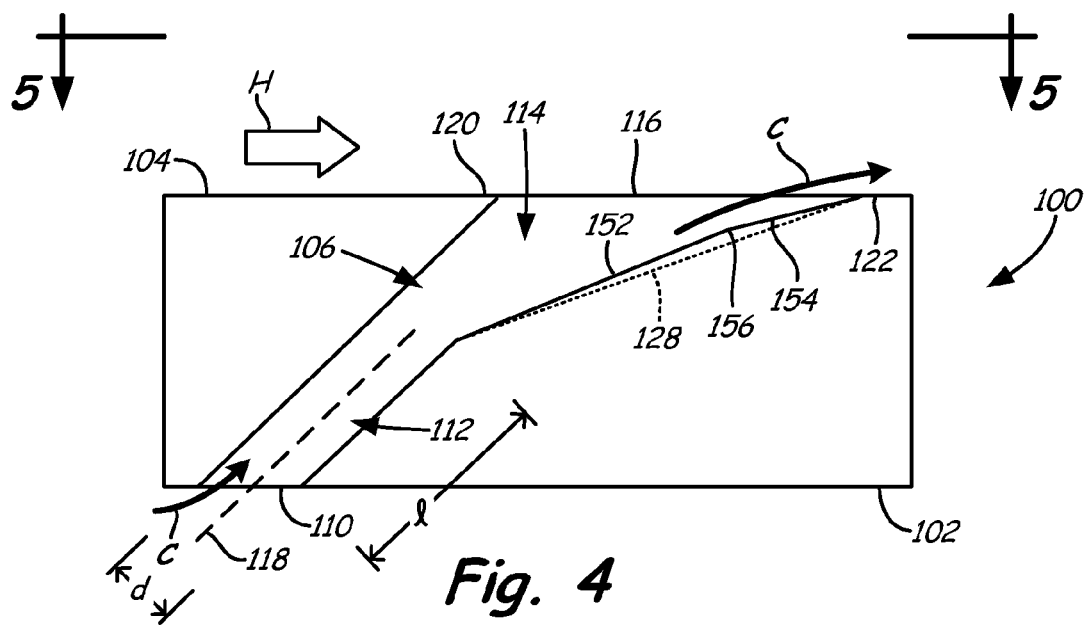
FIG. 4 is a sectional view of the multi-lobed cooling hole of FIG. 3 taken along the line 4-4.
Figure 5:
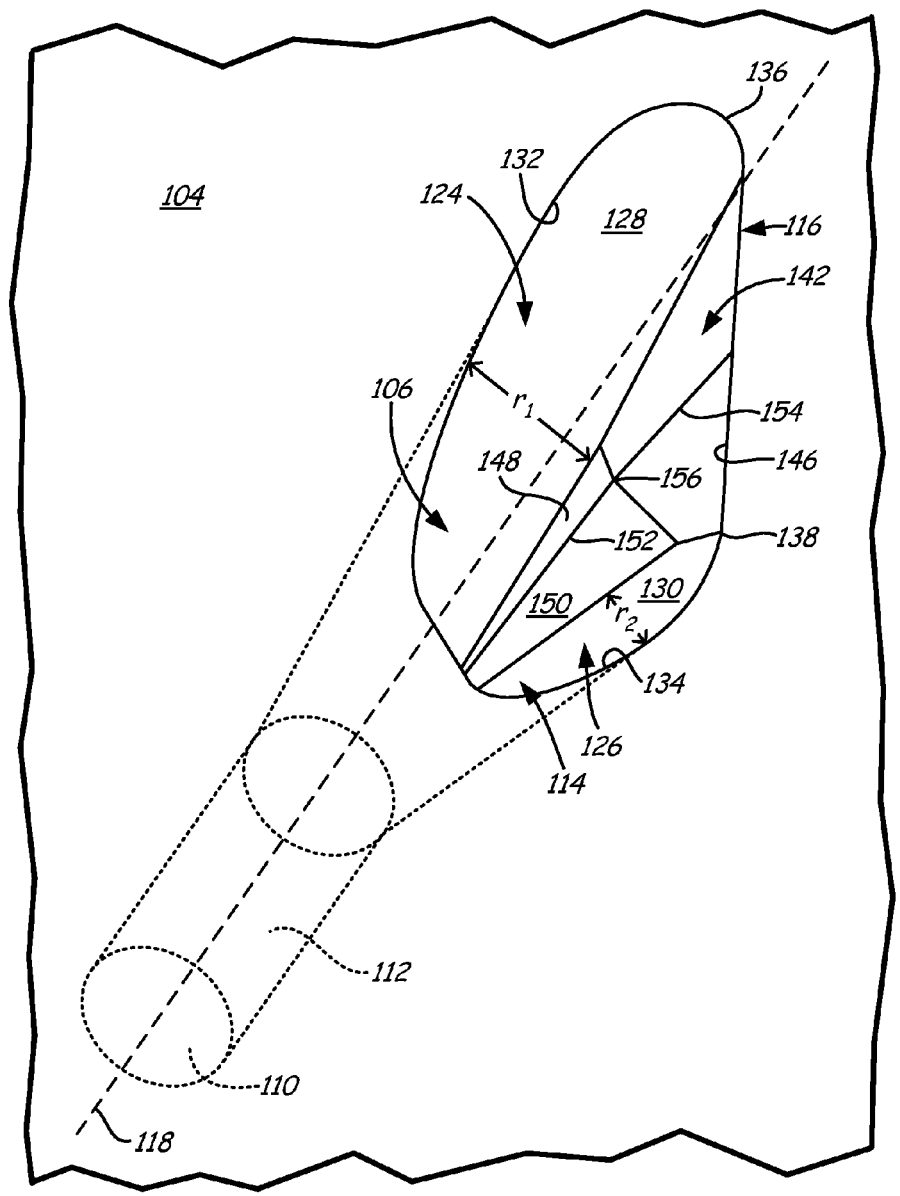
FIG. 5 is a view of the multi-lobed cooling hole of FIG. 4 taken along the line 5-5.

FIGS. 4 and 5 illustrate one embodiment of cooling hole 106 in greater detail. FIG. 4 illustrates a sectional view of multi-lobed film cooling hole 106 of FIG. 3 taken along the line 4-4. FIG. 5 illustrates a view of cooling hole 106 of FIG. 4 taken along the line 5-5. Cooling hole 106 includes inlet 110, metering section 112, diffusing section 114 and outlet 116. Inlet 110 is an opening located on first wall surface 102. Cooling air C enters cooling hole 106 through inlet 110 and passes through metering section 112 and diffusing section 114 before exiting cooling hole 106 at outlet 116 along second wall surface 104.

Metering section 112 is adjacent to and downstream from inlet 110 and controls (meters) the flow of air through cooling hole 106. In exemplary embodiments, metering section 112 has a substantially constant flow area from inlet 110 to first diffusing section 114. Metering section 112 can have circular, oblong (oval or elliptical), racetrack (oval with two parallel sides having straight portions), crescent, cusp or dual-cusp shaped cross sections. In FIGS. 4 and 5, metering section 112 has a circular cross section. Circular metering sections 112 have a length l and diameter d. In some embodiments, circular metering section 112 has a length l according to the relationship: $d \leq l \leq 3d$. That is, the length of metering section 112 is between one and three times its diameter. The length of metering section 112 can exceed 3 d, reaching upwards of 30 d. In alternate embodiments, metering section 112 has a non-circular cross section, such as an oblong, racetrack-shaped, crescent, cusp or dual-cusp shaped cross section, and their metering sections 112 have a length l and hydraulic diameter $d_h$. In some embodiments, metering section 112 has a length l according to the relationship: $d_h \leq l \leq 3d_h$. That is, the length of metering section 112 is between one and three times its hydraulic diameter.

Again, the length of metering section 112 can exceed 3 $d_h$, reaching upwards of 30 $d_h$. In exemplary embodiments, metering section 112 is inclined with respect to wall 100 as illustrated in FIG. 4 (i.e. metering section 112 is not perpendicular to wall 100). Metering section 112 has a centerline axis represented by numeral 118.

Diffusing section 114 is adjacent to and downstream from metering section 112. Cooling air C diffuses within diffusing section 114 before exiting cooling hole 106 at outlet 116 along second wall surface 104. Once cooling air C exits metering section 112, the flow of air expands to fill diffusing section 114. Cooling air C diffuses both longitudinally (shown best in FIG. 4) and laterally (shown best in FIG. 5) in diffusing section 114. Second wall surface 104 includes upstream end 120 (upstream of cooling hole 106) and downstream end 122 (downstream from cooling hole 106). Diffusing section 114 opens along second wall surface 104 between upstream end 120 and downstream end 122.

As shown best in FIG. 5, diffusing section 114 includes two channel-like lobes 124 and 126 as described in the U.S. Provisional Application No. 61/599,372, filed on Feb. 15, 2012 and entitled "MULTI-LOBED COOLING HOLE AND METHOD OF MANUFACTURE", which is incorporated by reference. Lobes 124 and 126 are surfaces of wall 100 which define the void of cooling hole 106 at diffusing section 114. Each lobe 124, 126 diverges longitudinally and laterally from metering section 112 and has a bottom surface (bottom surfaces 128 and 130, respectively), a side wall along the outer edge of diffusing section 114 (the side walls are represented by lines 132 and 134, respectively) and a trailing edge (trailing edges 136 and 138, respectively). FIG. 4 best illustrates the longitudinal divergence (from centerline axis 118), while FIG. 5 best illustrates the lateral divergence (from centerline axis 118). As shown in FIG. 5, first lobe 124 laterally diverges upwards from centerline axis 118 and second lobe 126 laterally diverges downwards from centerline axis 118. Cooling air C leaving metering section 112 and entering diffusing section 114 diffuses into lobes 124 and 126, causing the cooling air to spread laterally within diffusing section 114. Side wall 132 and bottom surface 128 direct cooling air C through first lobe 124, and side wall 134 and bottom surface 130 direct cooling air C through second lobe 126. As described below in greater detail, first lobe 124 and second lobe 126 have different shapes. For example, as shown in the embodiment illustrated in FIG. 5, second lobe 126 extends farther from centerline axis 118 than first lobe 124.

Diffusing section 114 can also include transition region 142. Transition region 142 is located between first lobe 124 and second lobe 126 as shown in FIG. 5. End 146 of transition region 142 is adjacent outlet 116 where the outlet meets second wall surface 104. The location of end 146 of transition region 142 relative to trailing edges 136 and 138 can also vary. In the embodiment shown in FIG. 5, end 146 meets trailing edges 136 and 138 of lobes 124 and 126, respectively at outlet 116. In this embodiment, trailing edges 136 and 138 and hence, first lobe 124 and second lobe 126, extend to outlet 116 at second wall surface 104. In other embodiments, end 146 of transition region 142 is spaced from trailing edges 136 and 138. In these embodiments, trailing edges 136 and 138 and hence, first lobe 124 and second lobe 126, do not extend to outlet 116 at second wall surface 104.

In the embodiment illustrated in FIG. 5, diffusing section 114 also includes first inclined portion 148 and second inclined portion 150. First inclined portion 148 is located adjacent to and extends from bottom surface 128 of first lobe 124. First inclined portion 148 extends from first lobe 124 towards ridge 152 and second lobe 126. Second inclined portion 150 is located adjacent to and extends from bottom surface 130 of second lobe 126. Second inclined portion 150 extends from second lobe 126 towards ridge 152 and first lobe 124. Depending on the location of cooling hole 106, first inclined portion 148 and second inclined portion 150 can have varying lateral and longitudinal lengths and extend from lobes 124 and 126 at various angles (inclinations). Like the side walls and bottom surfaces, first and second inclined portions 148 and 150 direct cooling air C through lobes 124 and 126 of diffusing section 114.

In some embodiments, first inclined portion 148 and second inclined portion 150 meet together to form a ridge as shown in FIG. 5. Ridge 152 is located between first lobe 124 and second lobe 126 at the intersection of first inclined portion 148 and second inclined portion 150. Ridge 152 aids in separating and directing the flow of cooling air C into first lobe 124 and second lobe 126. The location and angle of ridge 152 within diffusing section 114 can vary to direct cooling air C within diffusing section 114 to suit the location and desired flow profile of cooling hole 106.

Ridge 152 can extend longitudinally to varying degrees between metering section 112 and transition region 142. Ridge 152 can extend upstream all the way to metering section 112, beginning where metering section 112 and diffusing section 114 meet as shown in FIG. 4. Alternatively, ridge 152 can begin farther downstream (closer to outlet 116). Ridge 152 can extend downstream to transition region 142 as shown in FIG. 4. Alternatively, ridge 152 can converge with bottom surfaces 128 and 130 upstream of transition region 142. Corresponding changes to the longitudinal lengths of first inclined portion 148 and second inclined portion 150 must accompany any change in the longitudinal extension of ridge 152. As shown in FIG. 4, ridge 152 does not extend to outlet 116.

Transition region 142 can take various shapes and have different configurations depending on the location and desired flow profile of cooling hole 106. The bottom surface of transition region 142 can be flat or curved. A curved (e.g., longitudinally convex) bottom surface of transition region 142 can facilitate improved flow attachment due to the Coanda effect. Transition region 142 can have a compound trapezoidal shape as shown in FIG. 5. In some embodiments, ridge 154 separates transition region 142 into two sides having surfaces in two different planes. Ridge 154 tapers towards downstream end 122 of second wall surface 104 as shown in FIG. 4. The intersection of ridges 152 and 154 at the point where transition region 142 meets first inclined portion 148 and second inclined portion 150 forms apex 156. By forming apex 156 upstream of outlet 116, diffusing section 114 facilitates improved flow attachment.

In other embodiments, cooling hole 106 has diffusing section 114 with three channel-like lobes as described in the U.S. Provisional Application No. 61/599,381, filed on Feb. 15, 2012 and entitled "TRI-LOBED COOLING HOLE AND METHOD OF MANUFACTURE", which is incorporated by reference.

First lobe 124 and second lobe 126 can have different shapes. As shown in FIG. 5, side wall 134 of second lobe 126 extends farther away from centerline axis 118 than side wall 132 of first lobe 124, creating a lobe having a different shape than first lobe 124. The shapes of first lobe 124 and second lobe 126 can differ in one or more of several ways. For example, where lobes 124 and 126 are generally circular (i.e. sidewall 132 and bottom surface 128 form a generally circular arc), a radius generally describing first lobe 124 can differ from a radius generally describing second lobe 126, the larger lobe having the larger radius. FIG. 5 illustrates lobes 124 and 126 having different radii ($r_1$ and $r_2$, respectively). The radius r for a particular lobe need not be constant from metering section 112 to outlet 116. For example, radii $r_2$ for second lobe 126 can increase from metering section 112 to outlet 116, while radii $r_1$ for first lobe 124 remains relatively constant.

Figure 6:
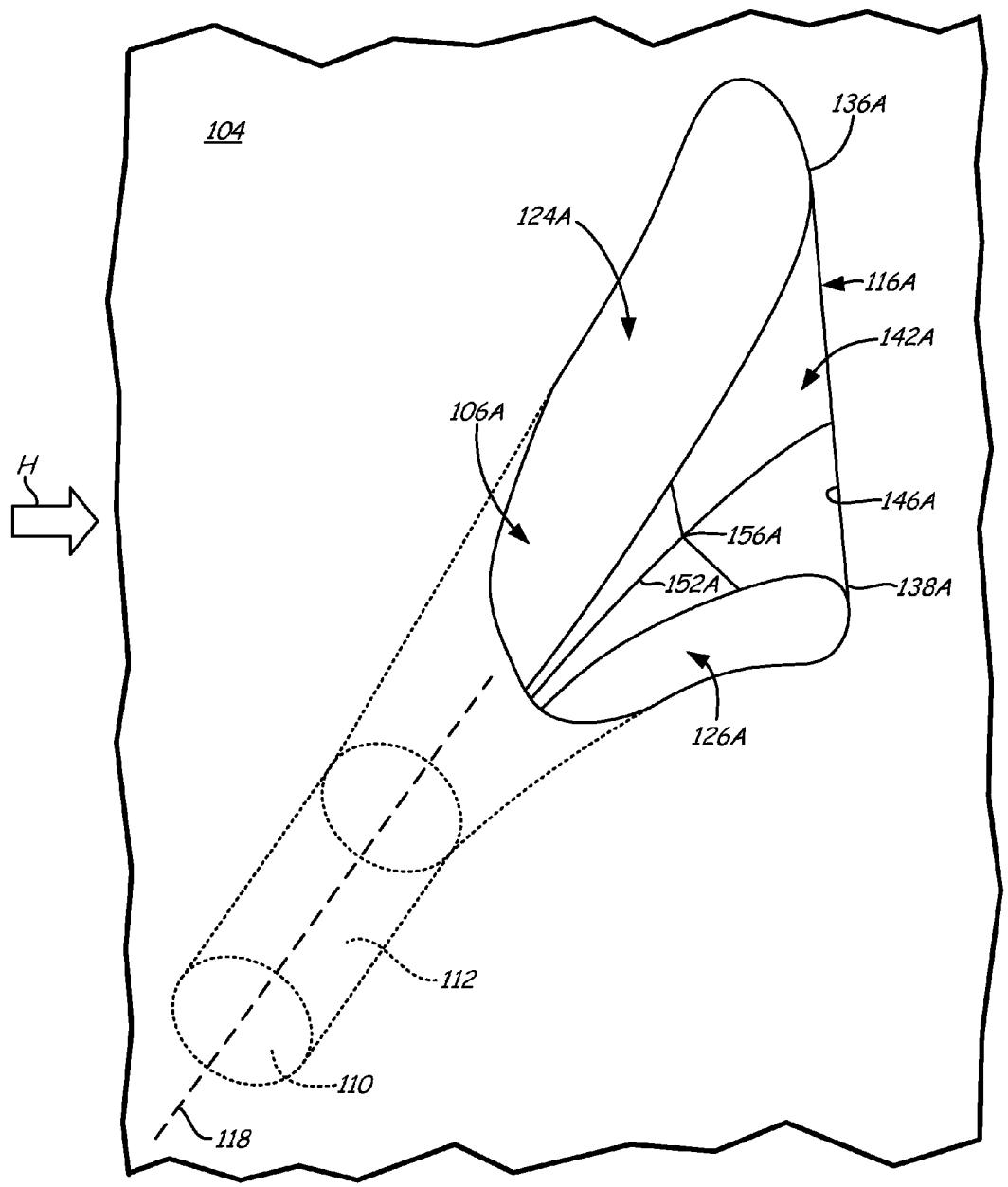
FIG. 6 is a view of another embodiment of a multi-lobed cooling hole.

In embodiments in which lobes 124 and 126 are generally straight, lobes 124 and 126 can have longitudinal axes that are not mirror images with respect to centerline axis 118. FIG. 6 illustrates longitudinal axis 158 of first lobe 124 and longitudinal axis 160 of second lobe 126. Axis 160 is angled from centerline axis 118 to a greater degree than axis 158, reflecting a difference in orientation and/or shape between first lobe 124 and second lobe 126. In embodiments in which lobes 124 and 126 are not generally straight, lobes 124 and 126 can have differing degrees of curvature. FIG. 6 illustrates one embodiment in which lobes 124A and 126A are curved and have different degrees of curvature. Other variations in shape include, but are not limited to, differences in the degree of curvature between the respective side walls and bottom surfaces of the lobes and differences in the length of the lobes with respect to inlet 110. In other embodiments, axes 158 and 160 can be symmetric about centerline axis 118, where axis 160 is angled from centerline axis 118 to the same degree as axis 158.

The shapes of first lobe 124 (or 124A) and second lobe 126 (or 126A) define flow volumes created by the lobes. Differences in lobe shapes produce differences in the flow volumes. Cooling hole 106 can be positioned on wall 100 to take advantage of the different flow volumes of lobes 124 and 126. Cooling hole 106 can be oriented so that areas of wall 100 that require greater film cooling receive cooling fluid from the lobe having a larger flow volume. For example, in some embodiments a lobe with a larger flow volume (i.e. larger size) is located upstream from the lobe having the smaller flow volume with respect to the high temperature gas flow (arrow H). As shown in cooling hole 106 illustrated in FIG. 7, the larger lobe (first lobe 124) is located upstream from the smaller lobe (first lobe 124) with respect to the high temperature gas flow (arrow H). In alternative embodiments the lobe with a larger flow volume is located downstream from the lobe having the smaller flow volume. These orientations provide cooling holes with the ability to concentrate film cooling effectiveness at a particular location along wall 100 while still providing a general cooling film along wall 100. Such orientations can be used to cool various features on wall 100 such as platforms, endwalls and various curved features of airfoils.

Figure 7:
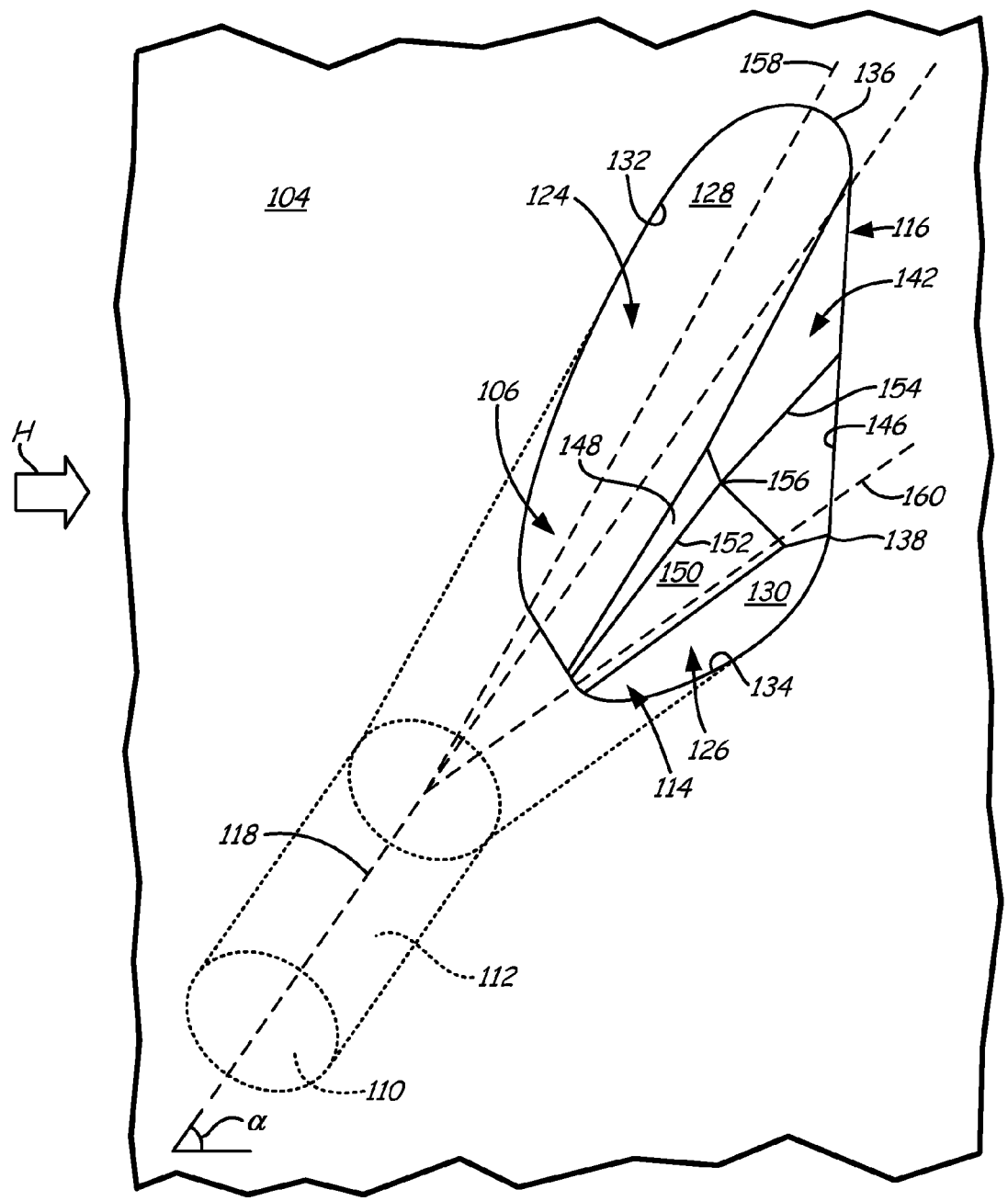
FIG. 7 is another view of the multi-lobed cooling hole of FIG. 5.

In some embodiments, cooling holes 106 are positioned so that air passing through cooling holes 106 travels in a generally different direction with respect to the high temperature gases flowing along second wall surface 104 (represented by arrow H in FIG. 7). As shown in FIG. 7, centerline axis 118 of cooling hole 106 is oriented radially when compared to high temperature gas flow H. Angle α represents the angle between centerline axis 118 and flow H. In exemplary embodiments, angle α is between about 50° and about 90°. In some embodiments, angle α is between about 60° and about 80°.

Figure 8:
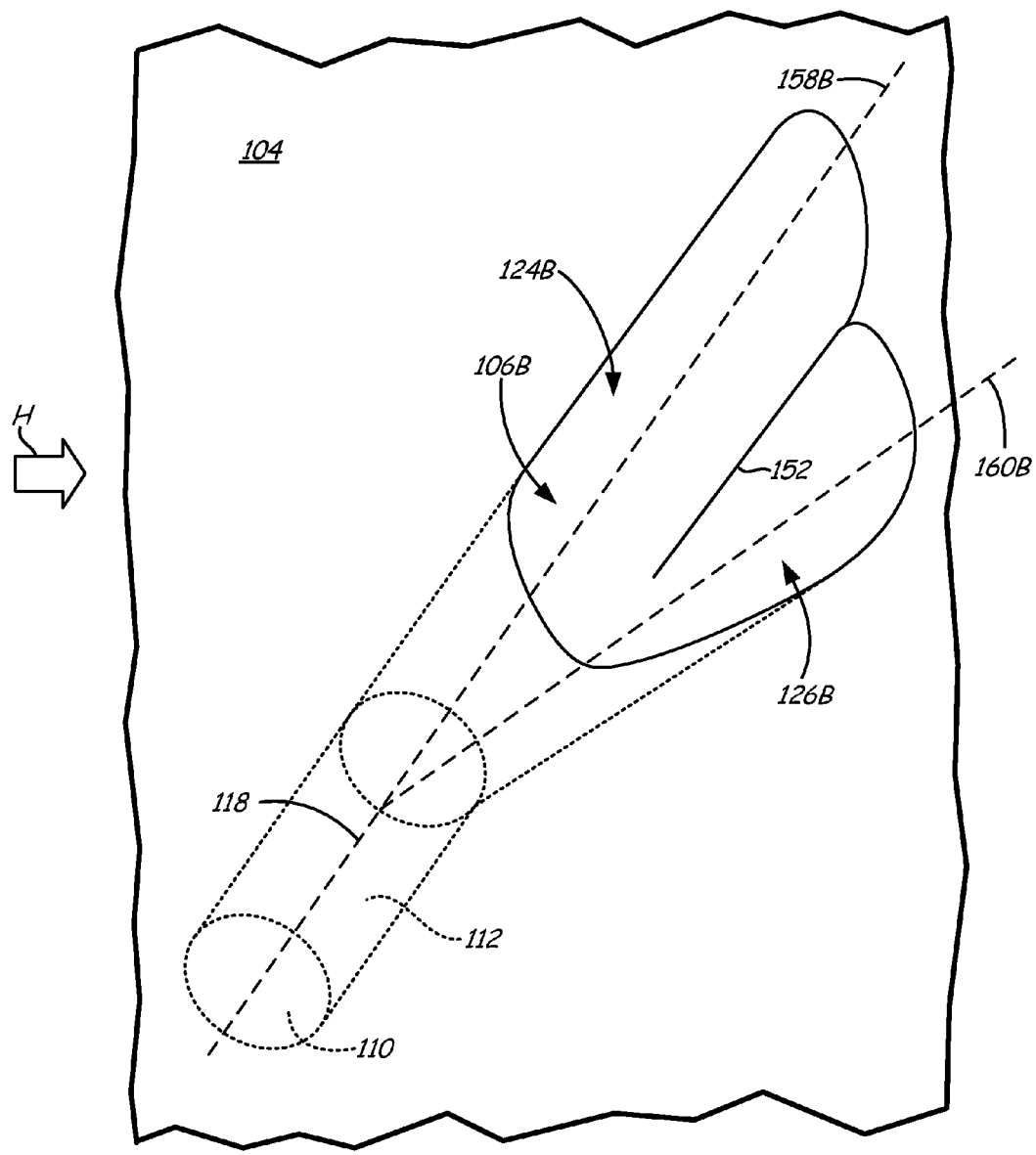
FIG. 8 is a view of another embodiment of a multi-lobed cooling hole.

In another embodiment, one of the lobes can have a longitudinal axis that is aligned with centerline axis 118 as described in the U.S. patent application Ser. No. 13/544,136, filed on Jul. 9, 2012 and entitled "COOLING HOLE WITH ASSYMETRIC DIFFUSER", which is incorporated by reference. FIG. 8 illustrates an embodiment in which axis 158B of lobe 124B is coincident with centerline axis 118. Lobe 124B is aligned with metering section 112, while lobe 126B diverges longitudinally and laterally from centerline axis 118 as shown by axis 160B.

The shape of diffusing section 114 improves the thermo-mechanical fatigue tolerance of cooling hole 106. Without transition region 142, the trailing edge of cooling hole 106 (where outlet 116 and outer wall surface 104 meet) would include sharp edges or corners at the trailing edge of ridge 152 and at trailing edges 136 and 138 of lobes 124 and 126. These sharp edges and corners are highly susceptible to thermo-mechanical fatigue. Over time, cracks develop in these areas due to the temperature cycling that occurs during operation. These cracks further reduce cooling effectiveness and performance and will eventually lead to failure, requiring replacement or repair of the affected component. Replacing and repairing components is costly both in terms of materials and in aircraft downtime. By incorporating transition region 142 into diffusing section 114, the previously sharp edges and corners are blended into smoother transitions that are less susceptible to thermo-mechanical fatigue. Additionally, smoother transitions near ridges 152 and 154 and trailing edges 136 and 138 reduces the likelihood that cooling air C will "jet off" instead of forming a cooling film along outer wall surface 104.

The gas turbine engine components, gas path walls and cooling passages described herein can thus be manufactured using one or more of a variety of different processes. These techniques provide each cooling hole and cooling passage with its own particular configuration and features, including, but not limited to, inlet, metering, transition, diffusion, outlet, upstream wall, downstream wall, lateral wall, lobe and downstream edge features, as described above. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), laser drilling, laser machining, electrical chemical machining (ECM), water jet machining, casting, conventional machining and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas flow path walls and outer surfaces of some gas turbine engine components include one or more coatings, such as bond coats, thermal barrier coatings, abrasive coatings, abradable coatings and erosion or erosion-resistant coatings. For components having a coating, the inlet, metering portion, transition, diffusion portion and outlet cooling features may be formed prior to coating application, after a first coating (e.g., a bond coat) is applied, or after a second or third (e.g., interlayer) coating process, or a final coating (e.g., environmental or thermal barrier) coating process. Depending on component type, cooling hole or passage location, repair requirements and other considerations, the diffusion portion and outlet features may be located within a wall or substrate, within a thermal barrier coating or other coating layer applied to a wall or substrate, or based on combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering portion, transition, outlet, diffusion portion and other cooling features. For example, when a thermal barrier coat or other coating is applied to the outer surface of a gas path wall before the cooling hole or passage is produced, laser ablation or laser drilling may be used. Alternatively, either laser drilling or water jet machining may be used on a surface without a thermal barrier coat. Additionally, different machining methods may be more or less suitable for forming different features of the cooling hole or cooling passage, for example, different EDM, laser machining and other machining techniques may be used for forming the outlet and diffusion features, and for forming the transition, metering and inlet features.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A gas turbine engine component subjected to a flow of high temperature gas can include a wall having first and second wall surfaces and a cooling hole extending through the wall. The cooling hole can include an inlet located at the first wall surface, an outlet located at the second wall surface, a metering section extending downstream from the inlet and a diffusing section extending from the metering section to the outlet. The diffusing section can include a first lobe, a second lobe and a transition region. The first lobe can diverge longitudinally and laterally from the metering section and has a first shape. The second lobe can be generally opposite the first lobe, can diverge longitudinally and laterally from the metering section and has a second shape different from the first shape. The transition region can be positioned between the first and second lobes and can include a downstream end adjacent the outlet.

The system of the preceding paragraph can optionally include, additionally and/or alternatively any, one or more of the following features, configurations and/or additional components:

the metering section can include a longitudinal axis and the longitudinal axis of the metering section can be oriented radially at an angle between about 50° and 90° relative to an axis representing flow of the high temperature gas flowing past the component;

the longitudinal axis of the metering section can be oriented radially at an angle between about 60° and 80° relative to the axis representing flow of the high temperature gas;

the first lobe can form a first flow volume and the second lobe can form a second flow volume;

the first lobe can be located upstream of the second lobe with respect to high temperature gas flowing past the component, and the first flow volume can be greater than the second flow volume;

the first lobe can be located upstream of the second lobe with respect to high temperature gas flowing past the component, and the second flow volume can be greater than the first flow volume;

the metering section can include a centerline axis, the first lobe can include a first longitudinal axis and the second lobe can include a second longitudinal axis; and the first longitudinal axis can be aligned with the centerline axis by a first angle and the second longitudinal axis can be aligned with the centerline axis by a second angle different from the first angle;

the metering section can include a centerline axis, the first lobe can include a first longitudinal axis and the second lobe can include a second longitudinal axis; and the first longitudinal axis can be aligned with the centerline axis by a first angle and the second longitudinal axis can be aligned with the centerline axis by a second angle that is equivalent to the first angle; and/or the metering section can include a centerline axis, the first lobe can include a first longitudinal axis and the second lobe can include a second longitudinal axis; and one of the first and second longitudinal axes can be coincident with the centerline axis.

A wall of a component of a gas turbine engine subjected to a flow of high temperature gas can include first and second wall surfaces, an inlet located at the first wall surface, an outlet located at the second wall surface, a metering section commencing at the inlet and extending downstream from the inlet and a diffusing section extending from the metering section and terminating at the outlet. The diffusing section can include a first lobe diverging longitudinally and laterally from the metering section and having a first shape, a second lobe generally opposite the first lobe and diverging longitudinally and laterally from the metering section and having a second shape different from the first shape, and a transition region positioned between the first and second lobes and having a downstream end adjacent the outlet.

The system of the preceding paragraph can optionally include, additionally and/or alternatively any, one or more of the following features, configurations and/or additional components:

the metering section can include a longitudinal axis and the longitudinal axis of the metering section can be oriented radially at an angle between about 50° and 90° relative to an axis representing flow of the high temperature gas flowing past the component;

the longitudinal axis of the metering section can be oriented radially at an angle between about 60° and 80° relative to the axis representing flow of the high temperature gas;

the first lobe can form a first flow volume and the second lobe can form a second flow volume;

the first lobe can be located upstream of the second lobe with respect to high temperature gas flowing past the component, and the first flow volume can be greater than the second flow volume;

the first lobe can be located upstream of the second lobe with respect to high temperature gas flowing past the component, and the second flow volume can be greater than the first flow volume;

the metering section can include a centerline axis, the first lobe can include a first longitudinal axis and the second lobe can include a second longitudinal axis; and the first longitudinal axis can be aligned with the centerline axis by a first angle and the second longitudinal axis can be aligned with the centerline axis by a second angle that is equivalent to the first angle;

the metering section can include a centerline axis, the first lobe can include a first longitudinal axis and the second lobe can include a second longitudinal axis; and the first longitudinal axis can be aligned with the centerline axis by a first angle and the second longitudinal axis can be aligned with the centerline axis by a second angle different from the first angle; and/or the metering section can include a centerline axis, the first lobe can include a first longitudinal axis and the second lobe can include a second longitudinal axis; and one of the first and second longitudinal axes can be coincident with the centerline axis.

The invention claimed is:

1. A gas turbine engine component subjected to a flow of high temperature gas, the component comprising:
   a wall having first and second wall surfaces; and
   a cooling hole extending through the wall and comprising:
      an inlet located at the first wall surface;
      an outlet located at the second wall surface;
      a metering section extending downstream from the inlet and comprising a centerline axis; and
      a diffusing section extending from the metering section to the outlet and comprising:
         a first lobe diverging longitudinally and laterally from the metering section and having a first shape and a first longitudinal axis aligned with the centerline axis by a first angle;
         a second lobe generally opposite the first lobe and diverging longitudinally and laterally from the metering section and having a second shape different from the first shape and a second longitudinal axis aligned with the centerline axis by a second angle that is equivalent to the first angle; and
         a transition region positioned between the first and second lobes, the transition region comprising a downstream end adjacent the outlet.

2. The component of claim 1, wherein the metering section comprises a longitudinal axis, and wherein the longitudinal axis of the metering section is oriented radially at an angle between about 50° and 90° relative to an axis representing flow of the high temperature gas flowing past the component.

3. The component of claim 2, wherein the longitudinal axis of the metering section is oriented radially at an angle between about 60° and 80° relative to the axis representing flow of the high temperature gas.

4. The component of claim 1, wherein the first lobe forms a first flow volume and the second lobe forms a second flow volume, and wherein the first lobe is located upstream of the second lobe with respect to high temperature gas flowing past the component, and wherein the first flow volume is greater than the second flow volume.

5. The component of claim 1, further comprising:
   a ridge extending between a portion of the first lobe and a portion of the second lobe.

6. The component of claim 1, wherein the first lobe forms a first flow volume and the second lobe forms a second flow volume.

7. The component of claim 6, wherein the first lobe is located upstream of the second lobe with respect to high temperature gas flowing past the component, and wherein the second flow volume is greater than the first flow volume.

8. A gas turbine engine component subjected to a flow of high temperature gas, the component comprising:
   a wall having first and second wall surfaces; and
   a cooling hole extending through the wall and comprising:
      an inlet located at the first wall surface;
      an outlet located at the second wall surface;
      a metering section extending downstream from the inlet; and
      a diffusing section extending from the metering section to the outlet and comprising:
         a first lobe diverging longitudinally and laterally from the metering section and having a first shape wherein the first lobe forms a first flow volume;
         a second lobe generally opposite the first lobe located downstream of the first lobe with respect to high temperature gas flowing past the component, the second lobe diverging longitudinally and laterally from the metering section and having a second shape different from the first shape wherein the second lobe forms a second flow volume, and wherein the first flow volume is greater than the second flow volume; and
         a transition region positioned between the first and second lobes, the transition region comprising a downstream end adjacent the outlet.

9. The component of claim 8, wherein the metering section comprises a centerline axis, the first lobe comprises a first longitudinal axis and the second lobe comprises a second longitudinal axis, and wherein the first longitudinal axis is aligned with the centerline axis by a first angle, and wherein the second longitudinal axis is aligned with the centerline axis by a second angle different from the first angle.

10. The component of claim 8, wherein the metering section comprises a centerline axis, the first lobe comprises a first longitudinal axis and the second lobe comprises a second longitudinal axis, and wherein one of the first and second longitudinal axes is coincident with the centerline axis.

11. The component of claim 8, further comprising a ridge extending between a portion of the first lobe and a portion of the second lobe.

12. A wall of a component of a gas turbine engine subjected to a flow of high temperature gas, the wall comprising:
   first and second wall surfaces;
   an inlet located at the first wall surface;
   an outlet located at the second wall surface;
   a metering section commencing at the inlet and extending downstream from the inlet and comprising a centerline axis; and
   a diffusing section extending from the metering section and terminating at the outlet, the diffusing section comprising:
      a first lobe diverging longitudinally and laterally from the metering section and having a first shape and a first longitudinal axis aligned with the centerline axis by a first angle;
      a second lobe generally opposite the first lobe and diverging longitudinally and laterally from the metering section and having a second shape different from the first shape and a second longitudinal axis aligned with the centerline axis by a second angle that is equivalent to the first angle; and
      a transition region positioned between the first and second lobes, the transition region comprising a downstream end adjacent the outlet.

13. The wall of claim 12, wherein the metering section comprises a longitudinal axis, and wherein the longitudinal axis of the metering section is oriented radially at an angle between about 50° and 90° relative to an axis representing flow of the high temperature gas flowing past the component.

14. The wall of claim 13, wherein the longitudinal axis of the metering section is oriented radially at an angle between about 60° and 80° relative to the axis representing flow of the high temperature gas.

15. The wall of claim 12, wherein the first lobe forms a first flow volume and the second lobe forms a second flow volume, and wherein the first lobe is located upstream of the second lobe with respect to high temperature gas flowing past the component, and wherein the first flow volume is greater than the second flow volume.

16. The wall of claim 12, further comprising a ridge extending between a portion of the first lobe and a portion of the second lobe.

17. A wall of a component of a gas turbine engine subjected to a flow of high temperature gas, the wall comprising:
  first and second wall surfaces;
  an inlet located at the first wall surface;
  an outlet located at the second wall surface;
  a metering section commencing at the inlet and extending downstream from the inlet; and
  a diffusing section extending from the metering section and terminating at the outlet, the diffusing section comprising:
    a first lobe diverging longitudinally and laterally from the metering section and having a first shape wherein the first lobe forms a first flow volume;
    a second lobe generally opposite the first lobe and located downstream of the first lobe with respect to high temperature gas flowing past the component and diverging longitudinally and laterally from the metering section and having a second shape different from the first shape wherein the second lobe forms a second flow volume, and wherein the second flow volume is greater than the first flow volume; and
    a transition region positioned between the first and second lobes, the transition region comprising a downstream end adjacent the outlet.

18. The wall of claim 17, wherein the metering section comprises a centerline axis, the first lobe comprises a first longitudinal axis and the second lobe comprises a second longitudinal axis, and wherein the first longitudinal axis is aligned with the centerline axis by a first angle, and wherein the second longitudinal axis is aligned with the centerline axis by a second angle different from the first angle.

19. The wall of claim 17, wherein the metering section comprises a centerline axis, the first lobe comprises a first longitudinal axis and the second lobe comprises a second longitudinal axis, and wherein one of the first and second longitudinal axes is coincident with the centerline axis.

20. The wall of claim 17, further comprising a ridge extending between a portion of the first lobe and a portion of the second lobe.

* * * * *